United States Patent
Dvir et al.

(10) Patent No.: US 8,243,869 B2
(45) Date of Patent: Aug. 14, 2012

(54) BURST MODE CLOCK AND DATA RECOVERY CIRCUIT AND METHOD

(75) Inventors: Amiad Dvir, Nes Ziona (IL); Raviv Weber, Herzilya (IL); David Avishai, Nes Ziona (IL); Alex Goldstein, Netanya (IL); Igor Elkanovich, Tel Mond (IL); Gal Sitton, Netanya (IL); Michael Balter, Tel Aviv (IL)

(73) Assignee: Broadlight Ltd. (IL)

( * ) Notice: Subject to any disclaimer, the term of this patent is extended or adjusted under 35 U.S.C. 154(b) by 1359 days.

(21) Appl. No.: 11/604,748

(22) Filed: Nov. 28, 2006

(65) Prior Publication Data

US 2008/0124092 A1    May 29, 2008

(51) Int. Cl.
  *H03D 3/24* (2006.01)

(52) U.S. Cl. ........ 375/376; 375/375; 375/354; 398/175; 398/155; 398/63; 327/236; 327/244; 370/395.62

(58) Field of Classification Search .................. 375/354, 375/375, 376; 398/175, 155, 63; 327/236, 327/244; 370/395.62
  See application file for complete search history.

(56) References Cited

U.S. PATENT DOCUMENTS

| | | | |
|---|---|---|---|
| 5,237,290 A | 8/1993 | Banu et al. | |
| 5,757,872 A | 5/1998 | Banu et al. | |
| 6,122,335 A | 9/2000 | Colella et al. | |
| 6,259,326 B1 | 7/2001 | Dunlop et al. | |
| 6,269,137 B1 | 7/2001 | Colella et al. | |
| 7,031,616 B2* | 4/2006 | Eilenberger et al. | 398/155 |
| 2002/0132598 A1* | 9/2002 | Saito | 455/183.1 |
| 2003/0002587 A1* | 1/2003 | Nguyen | 375/240.28 |
| 2004/0001567 A1* | 1/2004 | Wei | 375/371 |
| 2004/0252801 A1 | 12/2004 | Boles et al. | |
| 2005/0281366 A1* | 12/2005 | Shachar et al. | 375/376 |
| 2006/0031701 A1 | 2/2006 | Nam et al. | |
| 2006/0055472 A1* | 3/2006 | Bietti et al. | 331/57 |
| 2006/0115035 A1 | 6/2006 | Yu et al. | |
| 2007/0047680 A1* | 3/2007 | Okamura | 375/348 |
| 2007/0064850 A1* | 3/2007 | Tamura | 375/355 |
| 2007/0122159 A1* | 5/2007 | Dalton | 398/155 |

OTHER PUBLICATIONS

Liang, C., "A 2.5 Gbps Burst-Mode Clock and Data Recovery Circuit", 2005, Asian Solid-State Circuit Conference, 2005, p. 457-460.*

* cited by examiner

*Primary Examiner* — Shuwang Liu
*Assistant Examiner* — Sung Ahn
(74) *Attorney, Agent, or Firm* — Sterne, Kessler, Goldstein & Fox PLLC

(57) ABSTRACT

Burst mode clock and data recovery (BCDR) circuit and method capable of fast data recovery of passive optical network (PON) traffic. An over-sampled data stream is generated from an input burst data signal and a phase interpolator generates sampling clock signals using a reference clock and phase information. A phase estimation unit (PEU) determines a phase error in the over-sampled data streams; and a phase retrieval unit sets the phase interpolator with the respective phase information of the input burst data signal prior to reception of the input burst data signal.

26 Claims, 4 Drawing Sheets

BURST MODE CLOCK AND DATA RECOVERY CIRCUIT AND METHOD

REFERENCES CITED

Patents and Publications

| U.S. Pat. No. 5,237,290 | August 1993 | Banu, et al. |
|---|---|---|
| U.S. Pat. No. 5,757,872 | May 1998 | Banu, et al. |
| U.S. Pat. No. 6,122,335 | September 2000 | Colella, et al. |
| U.S. Pat. No. 6,259,326 | July 2001 | Dunlop, et al. |
| U.S. Pat. No. 6,269,137 | July 2001 | Colella, et al. |
| US 20040252801 | December 2004 | Glenn, et al. |
| US 20050281366 | December 2005 | Shachar, et al. |
| US 20060031701 | February 2006 | Nam, et al. |
| US 20060115035 | June 2006 | Yu, et al. |

FIELD OF THE INVENTION

This invention relates generally to passive optical networks (PONs) and, more particularly, to BCDR circuits for enhancing the efficiency of data reception in PONs.

BACKGROUND OF THE INVENTION

Many communication networks that provide high bit-rate transport over a shared medium are characterized by non-continuous or burst mode data transmission. An example for such network is a passive optical network (PON) 100 schematically shown in FIG. 1. A typical PON 100 includes a plurality of optical network units ONUs 120-1 through 120-M coupled to an OLT 130 via a passive optical splitter 140. Since all ONUs function in like manner, they will be collectively referred to by the reference numeral 120 in the following description unless reference is made to a specific ONU. Traffic data transmission may be achieved using GEM fragments or ATM cells over two optical wavelengths, one for the downstream direction and another for the upstream direction. Thus, downstream transmission from the OLT 130 is broadcast to all the ONUs 120. Each ONU 120 filters its respective data according to, for example, pre-assigned labels.

The OLT 130 continuously transmits downstream data to the ONUs 120 and receives upstream burst data sent to OLT 130 from ONUs 120. The OLT 130 broadcasts data to the ONUs 120 along a common channel so that all the ONUs 120 receive the same data. An ONU 120 transmits data to the OLT 130 during different time slots allocated by the OLT 130. That is, the OLT 130 is aware of the exact arrival time of data and the identity of a transmitting ONU 120.

A receiver in the OLT 130 uses a burst mode clock and data recovery (BCDR) circuit to generate a clock corresponding to the incoming data, thereby correctly retiming the incoming data. In the case of burst data transmission, a preamble is transmitted before the data to obtain the clock information before sampling the data.

Conventional clock and data recovery (CDR) and BCDR circuits are typically based on a phase locked loop (PLL) or over-sampling techniques. Examples of PLL based CDR and BCDR circuits may be found in U.S. Pat. Nos. 5,757,872, 5,237,290 and 6,259,326 as well as in US patent publications US2005281366 (Shachar et al.), US2006115035 (Yu et al.) and US2006031701 (Nam et al.) all of which are incorporated herein by reference for their useful background information.

In over-sampling based CDR and BCDR techniques, in general, data is obtained by sampling data over a multiphase clock. FIG. 2 shows a schematic block diagram of a typical over-sampling based BCDR circuit 200. The BCDR circuit 200 includes a reference oscillator 210 and a phase interpolator 220 that are used together to provide a number N of clock signals at the oscillating frequency generated by the oscillator 210. Each such clock signal is shifted in phase by a factor 1/N of the clock cycle with respect to the preceding signal. The clock signals are input into an over-sampler 230 utilized to retime the data and clock. The over-sampler 230 receives an input data signal and, using the clock signals, generates a digital representation of at least one complete period of the input data signal. A phase estimation circuit (PEC) 240 receives this digital representation and uses that representation to generate an estimate of the phase of the input data signal, as received. This estimate is input into the phase interpolator 220 to generate a correct sampling clock signal (e.g., the clock signal having a sampling edge closest to the middle of the bit-interval of input data signal) for future sampling of the input data signal. The PEC 240 also produces frequency information to align the recovered clock with the transmitted clock. Examples of over-sampling based CDR circuits may be found in U.S. Ser. No. 10/460,572 and in U.S. Pat. Nos. 6,122,335, 6,259,326 and 6,269,137, which are incorporated herein by reference for their useful background information. The over-sampling based CDR circuits are capable of both fast locking to a rapidly changed phase of the transmission clock and stable tracking of a slowly changing phase.

SUMMARY OF THE INVENTION

According to a first aspect of the invention, there is provided a burst mode clock and data recovery (BCDR) circuit capable of fast data recovery of passive optical network (PON) traffic, the BCDR circuit comprising:

an over-sampler capable of over sampling an input burst data signal and being further capable of generating over-sampled data streams;

a phase interpolator capable of generating sampling clock signals using a reference clock and phase information;

a phase estimation unit (PEU) capable of determining a phase error in the over-sampled data streams; and a phase retrieval unit capable of setting the phase interpolator with the respective phase information of the input burst data signal prior to reception of the input burst data signal.

According to a second aspect of the invention, there is provided a method for fast recovery of burst data transmitted from an optical line unit (ONU) to an optical line terminal (OLT) in a passive optical network (PON), the method comprising:

prior to receiving of an input burst data signal sent from the ONU, retrieving phase information associated with ONU;

generating sampling clock signals using a reference clock and the retrieved phase information; and over-sampling the input burst data signal using sampling clock signals to generate over-sampled data streams.

According to a third aspect of the invention, there is provided a burst mode clock and data recovery (BCDR) circuit capable of fast data recovery of passive optical network (PON) traffic, the BCDR circuit comprising:

an over-sampler capable of over sampling an input burst data signal and being further capable of generating over-sampled data streams;

a phase interpolator capable of generating sampling clock signals using a reference clock and an input sampling point;

a phase estimation unit (PEU) capable of directly estimating an exact sampling point for the input burst data signal; and a phase mover capable of adjusting the phase interpolator to the exact sampling point.

According to a fourth aspect of the invention, there is provided a method for fast recovery of burst data transmitted from an optical line unit (ONU) to an optical line terminal (OLT) in a passive optical network (PON), the method comprising:

receiving an input burst data signal;

estimating an exact sampling point for the input burst data signal;

adjusting a phase interpolator to generate sampling clock signals at the exact sampling point; and over-sampling the input burst data signal using sampling clock signals to generate over-sampled data streams.

According to a fifth aspect of the invention, there is provided a method for converting a conventional clock and data recovery (CDR) circuit into a burst mode CDR (BCDR), the method comprising:

providing a conventional CDR circuit that includes at least a digital filter for performing frequency correction functions performed by the digital filter; and disabling output signals of the digital filter that includes frequency information.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
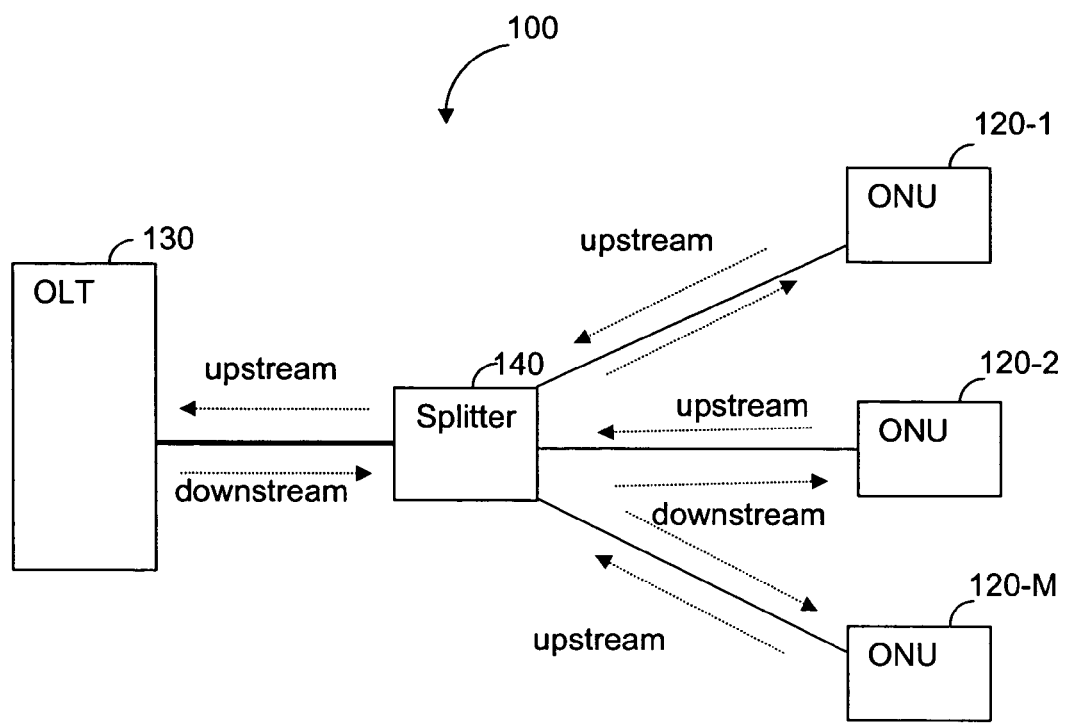
FIG. 1 is a schematic block diagram of a prior art PON.
Figure 2:
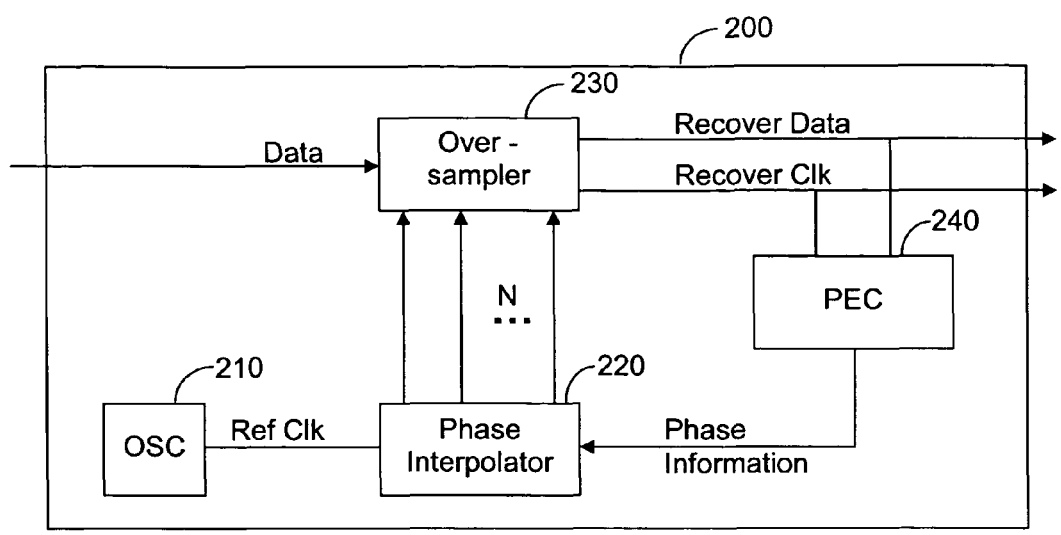
FIG. 2 is a schematic block diagram of a typical prior art over-sampling based CDR circuit.
Figure 3:
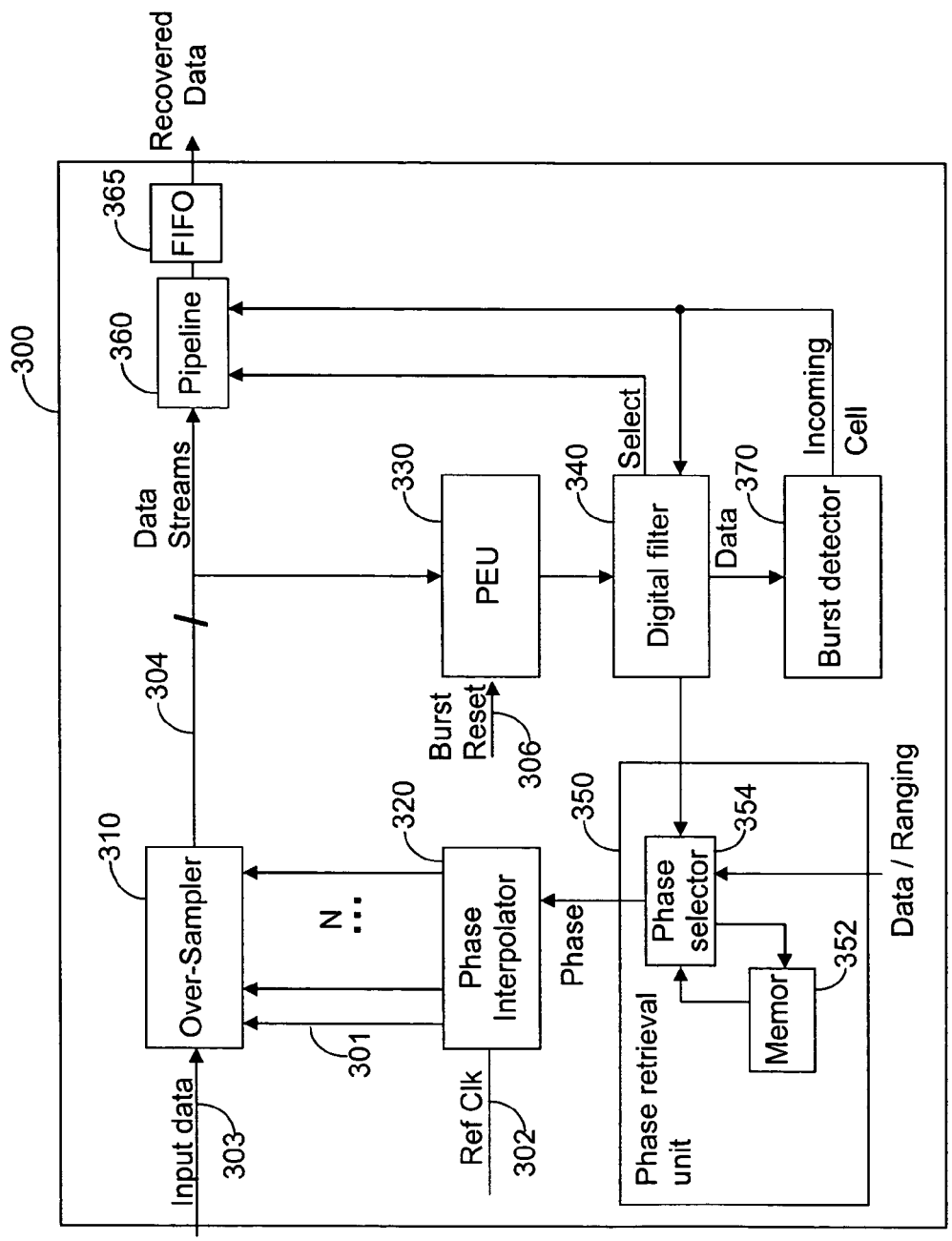
FIG. 3 is a block diagram of a BCDR circuit disclosed in accordance with one embodiment of the present invention.

FIG. 3 is a block diagram of a burst mode clock and data recovery (BCDR) circuit 300 implemented in accordance with one non-limiting embodiment of the present invention. The BCDR circuit 300 includes an over-sampler 310, a phase interpolator 320, a phase estimation unit (PEU) 330, a digital filter 340, a phase retrieval unit 350, and a pipeline 360. In one embodiment, the BCDR circuit 300 is installed in an OLT (e.g., OLT 130) and adapted to receive burst data sent from ONUs (e.g., ONUs 120) over the common channel.

The BCDR circuit 300 is based on a phase retrieval technique that allows for the immediate lock onto the phase of an input data signal, thereby recovering the data without delay and with a high level of accuracy. In a PON system, an OLT, in general, knows the exact time that an ONU transmits data and its identity (ID number) as the OLT allocates the time slots for transmissions. In addition, the common channel (i.e., optical fiber) has a maximum allowed change in the group-delay. The phase retrieval technique takes advantage of these attributes to set the phase of a clock signal used to recover data sent from an ONU prior to receiving data from that ONU.

The BCDR circuit 300 acquires the phase information on each ONU during setup mode and updates this information during the normal mode of operation. The phase information is saved in a memory 352 of the phase retrieval unit 350. The memory 352 is a read/write programmable memory. The phase retrieval unit 350 further includes a phase selector 354 that selects the source of the phase information to be provided to the phase interpolator 320. In a normal mode of operation the source is the memory 352 and in a set-up mode the source is the digital filter 340.

During the normal mode of operation of a PON, the BCDR circuit 300 is informed, by a Burst Reset 306 signal, of an ONU that is expected to send data. Using the ID of that ONU, its respective phase information is retrieved from the memory 352 and input to the phase interpolator 320. The phase interpolator 320 is used to generate a number N of sampling clock signals 301 at the oscillating frequency provided by a reference clock 302. Each signal 301 is shifted in phase by a factor 1/N of the clock cycle with respect to the preceding signal plus the retrieved phase. The over-sampler 310 receives input burst data signal 303. Using the sampling clock signals 301, it generates a number M of digital sampled data streams 304. The number M equals to the number of samples of a unit interval of data, i.e., the over-sampler 310 performs over sampling by a factor equal to M.

The PEU 330 receives the M data streams 304 and extracts the phase information of the input data signal 301. Specifically, the PEU 330 calculates the sampling point of data and the phase error.

The digital filter 340 compares the extracted phase information to the phase of the respective current transmitting ONU as stored in the memory 352. If the comparison results in inequality, the extracted phase information is saved in the memory 352 and sent to the phase interpolator 320 for future sampling of the input data signal 301 to recover the data in that signal; otherwise, data is sampled using the previous generated sampling signals.

The sampled data streams 304 are also input to the pipeline 360 in order to enable the selection of a correct data stream without losing data. The sampled data streams 304 propagate through the pipeline 360 and at its output a single stream is selected. That is, a data stream that results from sampling by what was determined to be the most accurate sampling clock signal 301 is selected by the digital filter 340. The selected data stream may also be saved in the memory 352. In addition, a first-in-first-out (FIFO) data structure 365 is coupled to the pipeline 360 to prevent the loss of data that could result from the potential lack of synchronization between the local ONU clock and the reference clock 302.

As mentioned above the acquisition of the phase information for each ONU is performed during the set-up mode of operation, which takes place during the activation procedures of an ONU. Two states are possible during this mode: serial number and ranging. In the serial number state, the OLT tries to detect the serial number that is the ONU's identifier (ID), while in the ranging state the OLT tries to determine the range between the terminal units (i.e., ONUs and OLT). Regardless of the active state, in the set-up mode the exact arrival time of data bursts sent from a designated ONU is unknown. However, this time is expected to occur at a predefined window ("ranging window"). With that said, determining the beginning of a ranging window using a BCDR circuit is one of the difficulties of OLT systems. For this purpose, the BCDR circuit 300 includes a burst detector 370 as further discussed below.

The burst detector 370 detects, with high accuracy, an incoming burst data during the set-up mode. A burst data is received in a form of a cell, which includes a preamble and data portions. The preamble has a predefined pattern of bits (e.g., [0101010101]) and its length is greater than 'm' bytes (m>2). The burst detector 370 processes sampled data streams 304 and tries to detect two types of events: a) a preamble pattern, and b) number of transitions. The burst detector 370 searches for a preamble pattern in each of the data streams. If a pattern is detected in any of the streams and within a predefined limit of length, then a preamble detected signal is asserted. The burst detector 370 further counts the number of transitions from '1' to '0' and from '0' to '1' in all sampling streams 304 during a predefined time interval. If the total count is within a predefined threshold a burst detection signal is asserted. The burst detector 370 can further assert a detection signal based on any combination of the two detection signals. The incoming burst indication is input to the pipeline 360, enabling the output of a selected stream only once a burst is detected, and thereby preventing the output of noise.

The incoming burst indication is further input to the digital filter 340 indicating when to begin the acquisition of phase information of an ONU. To this end, the phase interpolator 320 generates a number N of clock signals 301 at the oscillating frequency provided by a reference clock 302. Each clock signal 301 is shifted in phase by a factor 1/N of the clock cycle plus an arbitrary phase value with respect to the preceding signal. In one embodiment the initial phase can be selected and dithered to achieve fast detection of an ONU. The over-sampler 310 receives an input data signal 303 sent during the ranging window and, using the clock signals 301, generates digital sampled data streams 304. The PEU 330 receives the streams 304 and determines whether the sampled streams include a phase error.

If so, the digital filter 340 instructs the phase interpolator 320 to shift the clock signals 301 by b/k, where b represents the number of phase errors detected by the PEU 330 at the sampling point and k is the maximum number of possible phase error that can be detected in a single clock cycle. Each clock signal 301 is now shifted in phase by a factor $$\frac{b}{k}$$

of the clock cycle plus the arbitrary phase value with respect to the preceding signal, i.e., the $j^{th}$ clock signal is:

$$\text{clock}(j) = \text{clk\_ref}\left(\alpha + \frac{j}{N} + \frac{b}{k}\right).$$

The parameter a is an arbitrary phase determined at the beginning of the process and j is an integer number equals to 0, . . . , or N−1.

Subsequent sampled data streams 304 generated by the over sampler 310 using the new clock signals include no phase error. Subsequent sampled data streams 304 generated by the over sampler 310 using the new sampling clock signals 301 will continue to follow and correct the errors as detected by the PEU. The digital filter 340 saves the phase information of the clock signal 301 in the memory 352 in an entry of the respective ONU. It should be noted that during the set-mode, phase correction is optional where a single stream without making any phase correction. In an embodiment of the present invention the BCDR circuit 300 may recover incoming burst data where only a single sampled data stream is fed from the over-sampler 310 to the output of circuit 300. In this embodiment the BCDR circuit 300 may function without the pipeline 360, FIFO 365, and burst detector 370. In addition the action of selecting a sampled data stream, as preformed by the digital filter 340, is not required.

Figure 4:
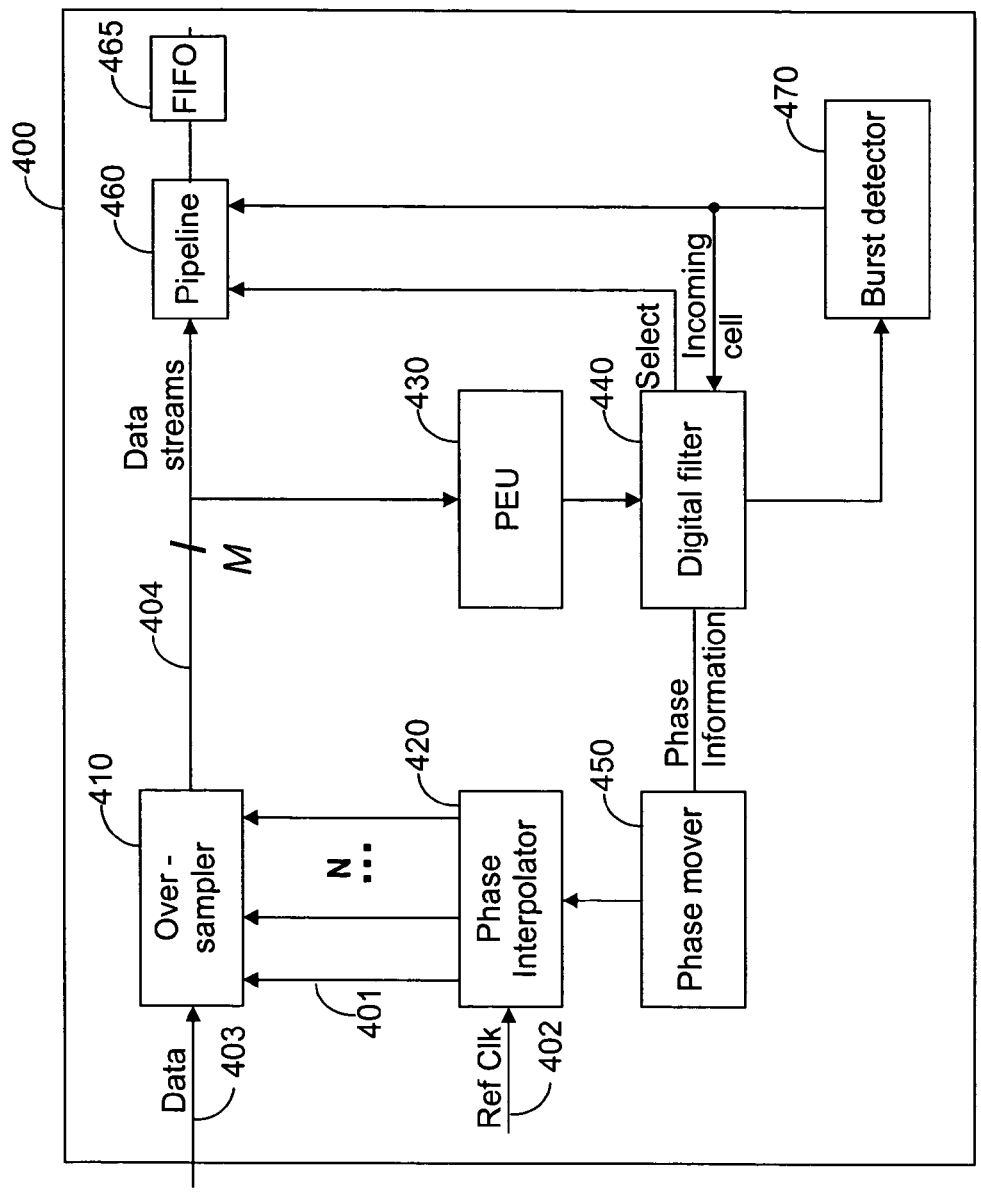
FIG. 4 is a block diagram of a BCDR circuit disclosed in accordance with another embodiment of the present invention.

FIG. 4 shows a non-limiting block diagram of a BCDR circuit 400 implemented in accordance with another embodiment of the present invention. The BCDR circuit 400 includes an over-sampler 410, a phase interpolator 420, a phase estimation unit (PEU) 430, a digital filter 440, and a phase mover 450. The BCDR circuit 400 also includes a pipeline 460 coupled to the output of the over-sampler 410 and a burst detector 470 coupled to the digital filter 440. Both the pipeline 460 and burst detector 470 have the same functionality described in greater detail above. In one embodiment, the BCDR circuit 400 is installed in an OLT (e.g., OLT 130) and adapted to receive burst data sent from ONUs (e.g., ONUs 120) over the common channel.

The BCDR circuit 400 is based on a phase movement technique that allows accelerating the recovery of received data. As discussed in the background of the invention, techniques have been proposed that use the sampled signals to estimate the correct phase of a clock signal to recover the data. This phase estimation is fed into the phase interpolator 420, and thereby allows the phase interpolator 420 to generate sampling clock signals with a correct phase. Typically, this is performed by: a) changing the phase (or sampling point) within the phase interpolator 420 in a predefined interval; b) generating new sampled data signals; c) estimating the phase error; and, d) changing again the sampling point in a predefined interval. The process is repeated until locking on the correct phase and is referred to as "phase movement".

The present invention accelerates the phase movement process by implementing and integrating the digital filter 440 and phase mover 450 in the BCDR circuit 400. Specifically, the digital filter 440 is configured with the physical parameters of the phase interpolator 420. The parameters include at least the maximal allowed phase change at each move and the minimum waiting time between moves. To recover the data from an input burst data signal 403 during the normal mode of operation, the phase interpolator 420 generates a number N of clock signals 401 at the frequency provided by a reference clock 402. Each signal 401 is shifted in a phase by a factor 1/N of the clock cycle with respect to the preceding signal. The over-sampler 410 receives the input data signal 403 and using the clock signals 401 generates digital sampled data streams 404.

The PEU 430 extracts from the sampled data streams 404 the phase (i.e., the sampling point) required to recover the data. The sampling point is input to the digital filter 440. The digital filter 440 knows the current state of the phase interpolator 420 and determines a new state to which the phase interpolator 420 should be transferred in order to generate the correct sampling clock signals 401. The phase mover 450 moves the phase interpolator 420 to its new state under the control of the digital filter 440, which takes into account the physical parameters of the phase interpolator 420. This allows adjusting the phase interpolator 420 to the correct sampling point with a minimal delay. While adjusting the phase interpolator 420 to its new state, the digital filter 440 can be configured either to disregard or to process phase estimations provided by the PEU 430. Specifically, when the phase error measured by the PEU 430 is above a predefined threshold, then the phase estimations are ignored, and thus sampled data streams generated during the phase adjustment do not affect the phase interpolator 420. Otherwise, the estimations are processed by the digital filter 430. Typically, once the phase interpolator 420 is set to its new state, the digital filter 440 tracks changes in the phase and enables small movement of the phase interpolator 420.

During set-up mode, the digital filter 430 sets the phase interpolator 420 to a state representing a correct sampling point using the same process described herein. However, the process for setting the phase interpolator 420 begins only upon assertion of the incoming burst indication by the burst detector 470. Until such indication is asserted the digital filter 440 can use generated sampled streams to determine the new state of the phase interpolator 420.

In an embodiment of the present invention the BCDR circuit 400 may recover incoming burst data where only a single sampled data stream is fed from the over-sampler 410 to the output of circuit 400. In this embodiment the BCDR circuit 400 may function without the pipeline 460, FIFO 465, and burst detector 470. In addition the action of selecting a sampled data stream, as preformed by the digital filter 440, is not required.

It should be noted that in PONs the clocks of the transmitting ONU and receiving OLT are synchronized. Therefore, there is no need to recover the frequency factor of the clock from a received input signal, as its value is known. Based on this description and facts, the present invention discloses a technique for modifying conventional and commercial CDR circuits into a burst mode CDR circuit applicable to many different systems, such as PON systems or others. This is performed by disabling signals including frequency information and frequency correction functions typically performed by the digital filter. This information is utilized to synchronize the clocks, i.e., allowing the receiver and transmitter clock to operate at exactly the same frequency.

The invention claimed is:

1. A burst mode clock and data recovery (BCDR) circuit for fast data recovery of passive optical network (PON) traffic, the BCDR circuit comprising:
   an over-sampler for over sampling an input burst data signal and being for generating over-sampled data streams;
   a phase interpolator for generating sampling clock signals using a reference clock and phase information;
   a phase estimation unit (PEU) for determining a phase error in the over-sampled data streams;
   a burst detector for generating an incoming burst data indication by identifying a known pattern in a preamble and a number of transitions in the over-sampled data streams;
   a phase retrieval unit for setting the phase interpolator with respective phase information of the input burst data signal prior to reception of the input burst data signal as indicated by the incoming burst data indication received from the burst detector; and
   a pipeline for delaying the over-sampled data streams from being output until a single data stream is selected, the selected single data stream is output when the incoming burst data indication is asserted.

2. The BCDR circuit of claim 1, further comprising:
   a digital filter for selecting from the over-sampled data streams a the single data stream representing a recovered data.

3. The BCDR circuit of claim 2, wherein the input burst data signal is sent from an optical network unit (ONU).

4. The BCDR circuit of claim 3, wherein the phase retrieval unit comprises:
   a memory for maintaining for each ONU in the PON its s respective phase information; and
   a phase selector for selecting the source of the phase information.

5. The BCDR circuit of claim 4, wherein the phase selector is controlled by the digital filter.

6. The BCDR circuit of claim 5, wherein the source of the phase information is either the memory or the phase retrieval unit (PEU).

7. The BCDR circuit of claim 5, wherein the digital filter is further being capable of updating the phase information in the memory if the phase error is detected in the over-sampled data streams.

8. The BCDR circuit of claim 6, wherein during a set-up mode of operation of the PON the PEU is selected as the source of the phase information; and wherein during a normal mode of operation of the PON the phase retrieval unit (PEU) is selected as the source of the phase information.

9. The BCDR circuit of claim 8, wherein the phase information saved in the memory is acquired during the set-up mode of operation.

10. The BCDR circuit of claim 1, wherein the BCDR is integrated in an optical line terminal (OLT) of the PON.

11. The BCDR circuit of claim 1, wherein the PON comprises at least one of: a Gigabit PON (GPON), an Ethernet PON (EPON), a broadband (BPON).

12. A method for fast recovery of burst data transmitted from an optical network unit (ONU) to an optical line terminal (OLT) in a passive optical network (PON), the method comprising:
   prior to receiving of an input burst data signal sent from the ONU, retrieving phase information associated with ONU, wherein receiving of the input burst signal is indicated by an incoming burst data indication received from a burst detector;
   generating sampling clock signals using a reference clock and the retrieved phase information;
   over-sampling the input burst data signal using sampling clock signals to generate over-sampled data streams;
   generating the incoming burst data indication by identifying a known pattern in a preamble and a number of transitions in the over-sampled data streams; and
   delaying the over-sampled data streams from being output until a single data stream is selected, the selected data stream is output when the incoming burst data indication is asserted.

13. The method of claim 12, further comprising:
   selecting from the over-sampled data streams the single over-sampled data stream representing recovered data.

14. The method of claim 12, wherein the phase information of the PON is acquired during a set-up mode of operation of the PON.

15. The method of claim 14, further comprising:
   detecting, during normal mode of operation of the PON, a phase error in the over-sampled data streams; and
   updating the phase information if a phase error is detected.

16. A burst mode clock and data recovery (BCDR) circuit for fast data recovery of passive optical network (PON) traffic, the BCDR circuit comprising:
   an over-sampler for over sampling an input burst data signal and being further for generating over-sampled data streams;
   a phase interpolator for generating sampling clock signals using a reference clock and an input sampling point;
   a phase estimation unit (PEU) for directly estimating an exact sampling point for the input burst data signal;
   a burst detector for generating an incoming burst data indication by identifying a known pattern in a preamble and a number of transitions in the over-sampled data streams;

a digital filter for setting, during a set-up mode of the PON, the phase interpolator to a state representing a correct sampling point and determining, during a normal mode of operation of the PON, a new state to move the phase interpolator based on the state set during the set-up mode, thereby generating an exact sampling clock point, wherein the setting of the phase interpolator is performed when the incoming burst data indication is asserted;

a phase mover for adjusting the phase interpolator to the exact sampling point under a control of the digital filter based on the sampling point set during the set-up mode of the PON; and a pipeline for delaying over-sampled data streams from being output until a single data stream is selected, the selected single data stream is output when the incoming burst data indication is asserted.

17. The BCDR circuit of claim 16, wherein the digital filter is configured to select from the over-sampled data streams the single data streams representing recovered data.

18. The BCDR circuit of claim 16, wherein the phase mover is configured with physical parameters of the phase interpolator.

19. The BCDR circuit of claim 18, wherein the phase mover parameter comprises at least: maximum allowed phase change at each move and minimum waiting time between moves.

20. The BCDR circuit of claim 16, wherein during the adjustment of the phase interpolator, the digital filter is adapted to filter only those phase estimations for which a corresponding phase error is below a predefined threshold.

21. The BCDR circuit of claim 16, wherein the BCDR is integrated in an optical line terminal (OTL) of the PON.

22. The BCDR circuit of claim 16, wherein the PON comprises at least one of: a Gigabit PON (GPON), an Ethernet PON (EPON), a broadband PON (BPON).

23. A method for fast recovery of burst data transmitted from an optical network unit (ONU) to an optical line terminal (OLT) in a passive optical network (PON), the method comprising:
 setting, during a set-up mode of the PON, a phase interpolator to a state representing a correct sampling point;
 during a normal operation mode of the PON, performing:
  receiving an input burst data signal;
  estimating an exact sampling point for the input burst data signal, based on a current state of the phase interpolator;
  adjusting the phase interpolator to generate sampling clock signal at the exact sampling point;
  over-sampling the input burst data signal using sampling clock signals to generate over-sampled data streams;
  generating the incoming burst data indication by identifying a known pattern in a preamble and a number of transitions in the over-sampled data streams; and
  delaying the over-sampled data streams from being output data until a single data stream is selected, the selected data steam is output when the incoming burst data indication is asserted.

24. The method of claim 12, further comprising:
 selecting from the over-sampled data streams the single over-sampled data stream representing recovered data.

25. The method of claim 23, wherein prior to estimating the exact sampling point:
 generating sampling clock signals using a reference signal; and
 over-sampling the input burst data signal using the sampling clock signals.

26. The method of claim 23, further comprising:
 processing information from sampling point estimations while adjusting the phase interpolator if phase error is below a predefined threshold.

* * * * *